C. A. KELLOGG's
103197 Pruning Shears  PATENTED MAY 17 1870
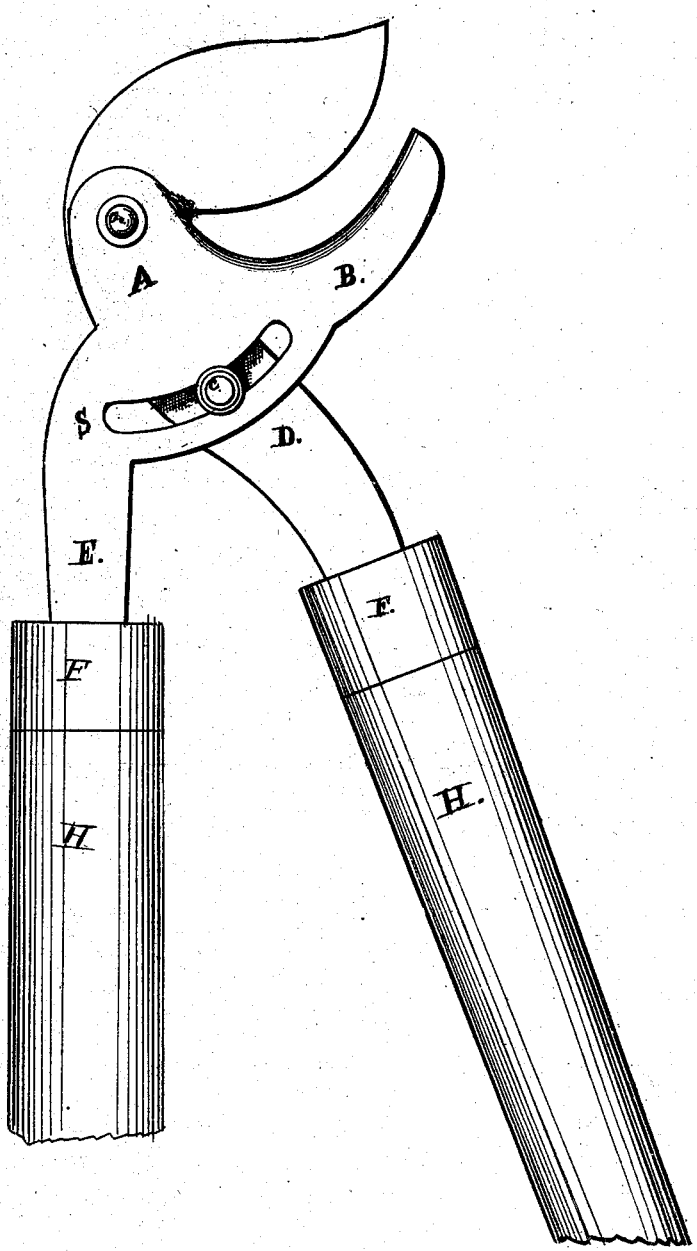
Witnesses:
S. F. Ward
Jno Rood
Inventor
C. A. Kellogg

United States Patent Office.

CLEMENT A. KELLOGG, OF ELYRIA, OHIO.

Letters Patent No. 103,197, dated May 17, 1870.

IMPROVEMENT IN PRUNING-SHEARS.

The Schedule referred to in these Letters Patent and making part of the same.

I, CLEMENT A. KELLOGG, of Elyria, in the county of Lorain and State of Ohio, have invented certain Improvements in Pruning-Shears, of which the following is a specification.

Nature and Object of the Invention.

The first part of my invention is in the shape given the jaws of the shears, as they are related to the handles, they being at right angles with the handles and pivoted in the angle, thereby giving the apparatus great power over the resistance.

The second feature of the invention consists in the fact that the shape given the parts gives broad facings at the junction of the jaws together, combined with a curved slot and bolt, holding the parts firmly against lateral displacement.

General Description.

In the accompanying drawing—

A shows the holding-jaw of the shears, the part B being rounded and curved, and being finished with a curved slot, S, made with a radius from the center $a$.

E, F, and H show the handle; only a small part of the wooden handle is shown. The handles are about two and a half feet in length.

C and D show the cutting-jaw, with H, part of its handle.

The cutting-edge is curved, and at nearly right angles with the handle.

$c$ is a headed and stout bolt, passing through the slot S, and holding the two parts of the shears in the same plane, and allowing them to move smoothly.

The shears represented have this advantage: The cutting-edge, being at right angles with the handle, the limb to be cut off can be brought very close to the center or fulcrum—much nearer than when right-lined jaws cross each other in the usual form. The fulcrum may be placed much nearer than is represented in the accompanying drawing.

Another advantage of this mode of constructing the cutting parts of the shears is that the edge cuts diagonally as represented by the dotted line.

With shears like those represented, with a cutting-edge three and a half inches in length, an apple-tree or other limb, an inch and a half in diameter, can be cut off with great ease.

Claim.

I claim as my invention—

The within-described pruning-shears, consisting of the curved blade C, connected at right angles to its handle, and the curved blade B, pivoted at $a$ to the blade C, and provided with a slot, S, through which passes the guide $c$, connected to the part D, all constructed and operated as shown and set forth.

CLEMENT A. KELLOGG.

Witnesses:
L. F. WARD,
IRA ROOD.